June 27, 1933.  E. G. GRIFFITH  1,915,605
BRUSH WHEEL STRUCTURE FOR FRUIT WASHERS
Filed Feb. 7, 1931  3 Sheets-Sheet 1
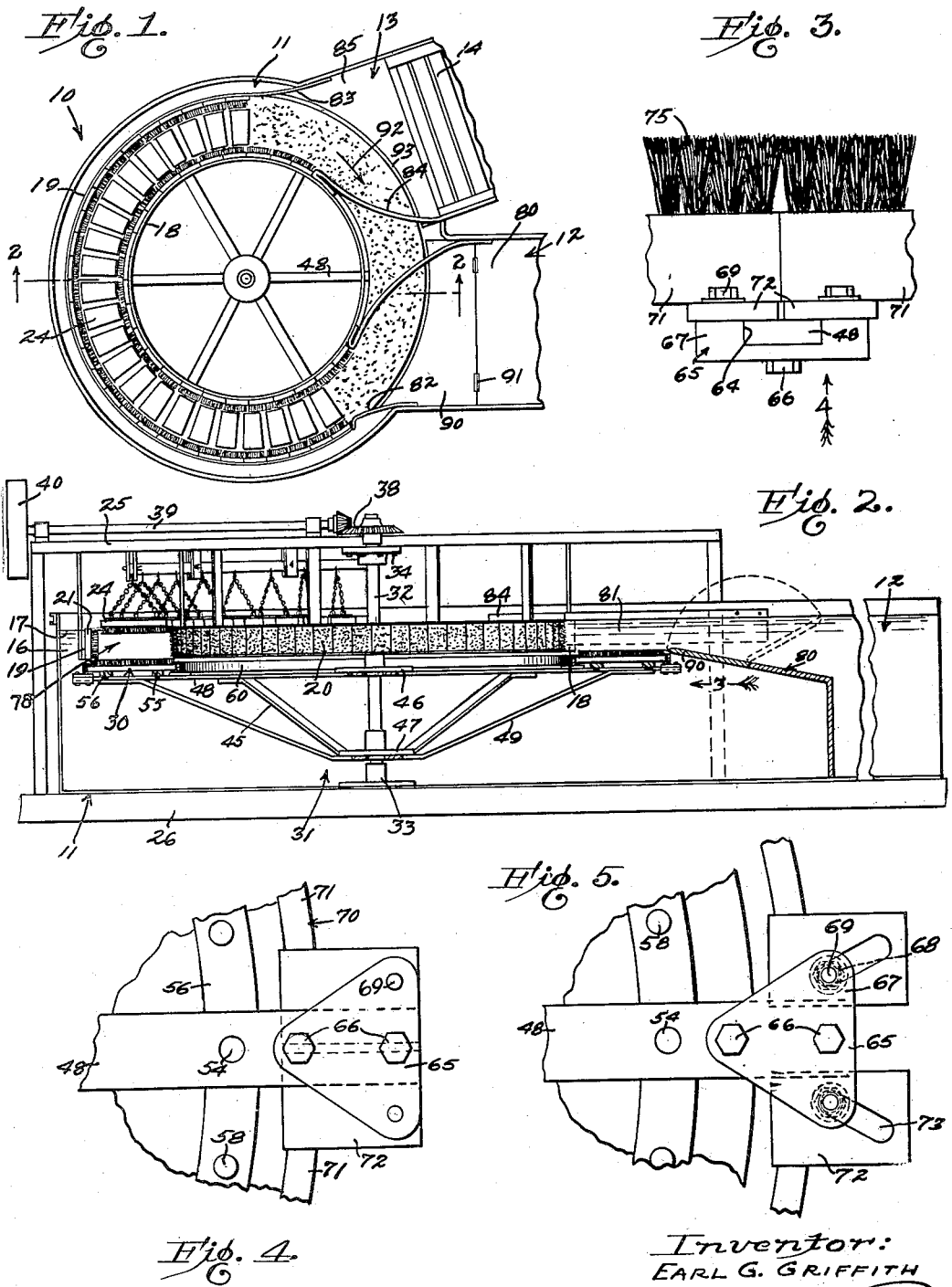
Inventor:
EARL G. GRIFFITH
By Dana E. Keech
Attorney June 27, 1933.  E. G. GRIFFITH  1,915,605
BRUSH WHEEL STRUCTURE FOR FRUIT WASHERS
Filed Feb. 7, 1931  3 Sheets-Sheet 2
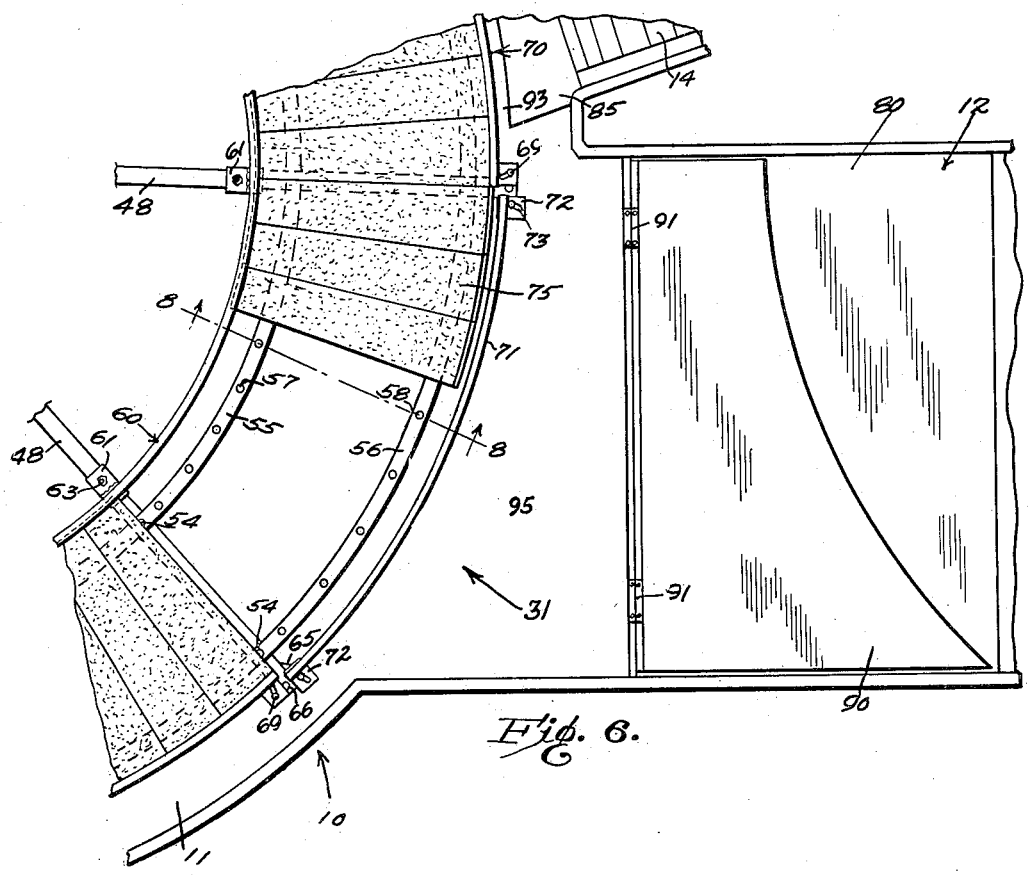
Fig. 6.
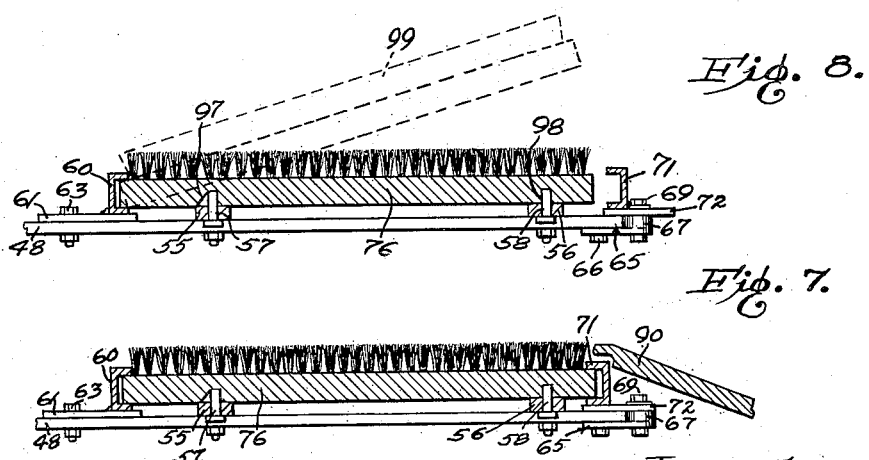
Fig. 8.
Fig. 7.
Inventor:
EARL G. GRIFFITH
By
Attorney

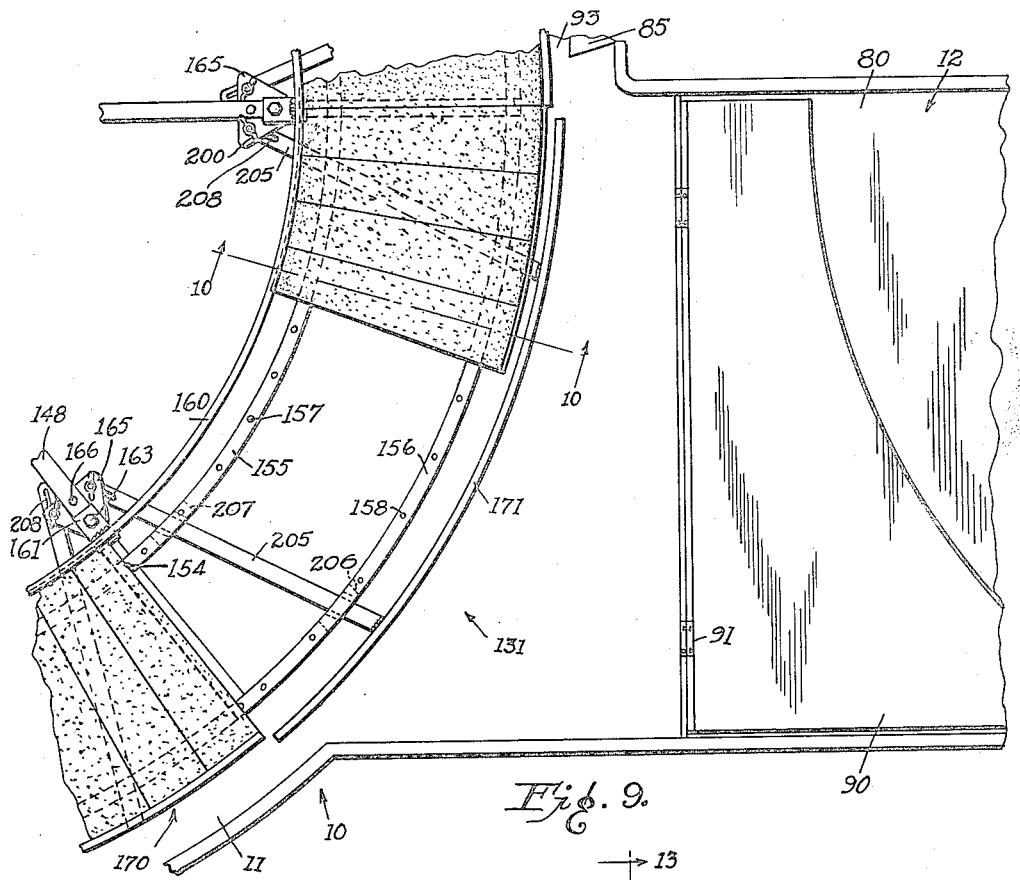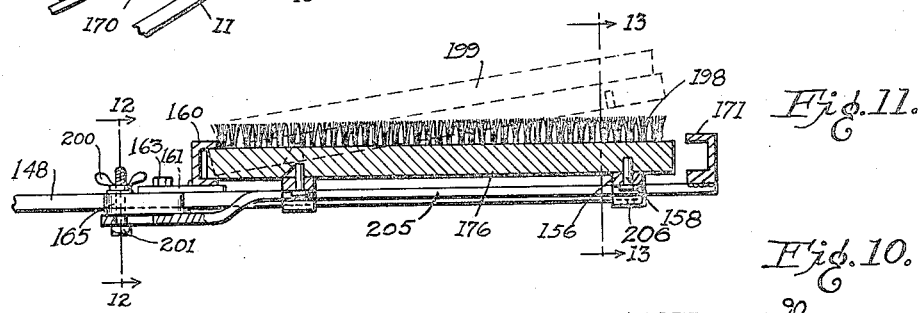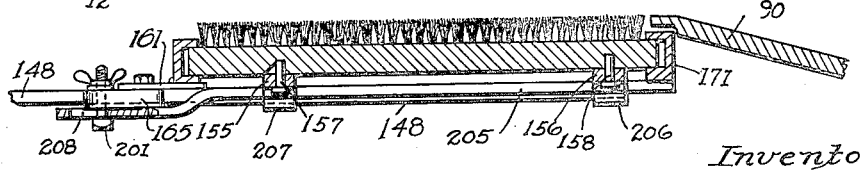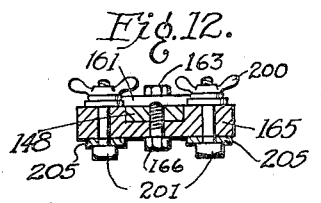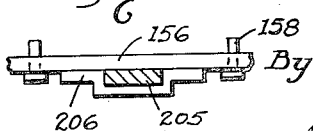

Patented June 27, 1933

1,915,605

UNITED STATES PATENT OFFICE

EARL G. GRIFFITH, OF LOS ANGELES, CALIFORNIA

BRUSH WHEEL STRUCTURE FOR FRUIT WASHERS

Application filed February 7, 1931. Serial No. 514,119.

My invention relates to brushes and brush holders and is particularly adapted for use in a commercial fruit washer.

In the citrus industry in the United States, machines of several different types are extensively used for washing oranges, lemons and grapefruit. Because of its gentle treatment of the fruit, the Corey washer has been in general use for the past twenty years in washing lemons.

In the Corey washer a horizontal, annular brush, about six feet in diameter and facing upward, is rotatably mounted in a tank and stationary spaced vertical guide walls are disposed over the rotary brush to form a semi-annular washing channel, the outer or both of these walls being faced with brushes. Above this channel is suspended horizontally a flexibly connected series of brushes, and the tank is filled with water to the level of the last mentioned brushes while the annular brush beneath the washing channel is rotated to feed fruit, submerged in said water, along said channel. During its passage along this channel, the fruit is scrubbed clean by contact with the brushes.

As the fruit is usually heavier than water the bristles on the brush wheel in the Corey washer tend to become beaten down, worn off, or pulled out by friction with the fruit. Occasionally the bristles are pulled out in large patches without warning so that there is danger of injuring the fruit if the washer is continued in operation.

As most fruit is easily injured and lemons are particularly sensitive to rough treatment, the washer must be stopped and the damaged brushes replaced by good ones before again running fruit. Breakdowns of this nature happen, as often as not, right in the middle of the working day. The length of time consumed in replacing brushes in the washer wheel is therefore a matter of considerable interest to the packing house management.

In the Corey washer in general use, the brush wheel has an annular wooden platform, and the annular brush, above mentioned, is formed by mounting on the upper face of this platform a series of segment-like brushes which are secured in place by screws extending up through the platform. In order to change any brushes in this construction, the tank must be drained, a man must crawl beneath the wheel, and the screws removed and replaced to effect the desired replacement of brushes. This takes a long time and is an extremely uncomfortable task for the workman to whom it is allotted.

It is an object of my invention to provide a fresh fruit washer of the Corey type in which the brushes on the brush wheel may be replaced easily with a relatively short interruption of the operation of the washer.

In the wooden Corey washer wheel described above the screws occasionally work loose from brushes on the wheel, permitting these brushes to come off with resulting damage to the rest of the washer and to the fruit passing therethrough.

A further object of my invention is to provide a strong washer wheel construction which will securely retain the brushes in place against any possible chance of dislodgment.

The manner of accomplishing the foregoing objects, as well as further objects and advantages, will be made manifest in the following description, together with the accompanying drawings, in which:

Fig. 1 is a diagrammatic plan view illustrating a Corey washer embodying my invention.

Fig. 2 is a transverse vertical sectional view taken on the line 2—2 of Fig. 1.

Fig. 3 is a fragmentary enlarged detail view taken in the direction of the arrow 3 of Fig. 2.

Fig. 4 is an enlarged detail view taken in the direction of the arrow 4 in Fig. 3.

Fig. 5 is a view similar to Fig. 4 with the parts illustrated therein shown in different positions.

Fig. 6 is an enlarged fragmentary plan view of a brush wheel of the washer shown in Fig. 1 illustrating the functioning of the brush wheel of my invention in the replacing of brushes therein.

Fig. 7 is an enlarged cross sectional view taken on the line 2—2 of Fig. 1 illustrating the position of parts of the brush wheel structure of my invention while in use.

Fig. 8 is a view similar to Fig. 7 and taken on the line 8—8 of Fig. 6 and illustrates the manner of replacing brushes in the brush wheel of my invention.

Figs. 9, 10 and 11 are similar respectively to Figs. 6, 7 and 8 and illustrate a modified form of the brush wheel structure of my invention.

Fig. 12 is an enlarged cross sectional view taken on the line 12—12 of Fig. 11.

Fig. 13 is an enlarged view taken on the line 13—13 of Fig. 11.

Referring specifically to the drawings, a preferred embodiment of my invention is incorporated in a Corey washer 10 which includes a tank 11 provided with a fruit soaking bay 12 and a fruit discharge bay 13, the latter having a discharge elevator 14. The tank 11 is adapted to be filled with water or other washing fluid 16 up to the level 17. Submerged in the water 16 are inner and outer vertical walls 18 and 19 which are usually provided with inwardly disposed brush faces 20 and 21, although sometimes the inner wall 18 is left bare. Supported loosely above the space between the walls 18 and 19 and with their bristles extending into the water 16 is a series of overhead brushes 24, adjacent brushes of which are loosely connected together as by hinges. The walls 18 and 19 and the overhead brushes 24 are supported by a frame 25 which rises from a base 26 on which the tank 11 rests, and extends over the tank. Submerged in the water 16 beneath the walls 18 and 19 is an annular brush member 30 which is mounted upon and adapted to be rotated by a washer brush wheel 31.

The wheel 31 has a shaft 32 journalled at its lower and upper ends in bearings 33 and 34 provided on the bottom of tank 11 and on the frame 25 respectively, the upper end of the shaft 32 being connected by gearing 38 to a drive shaft 39 having a pulley 40 by which the wheel 31 is rotated.

Provided on the shaft 32 is a wheel frame 45 which may be of any desired structure and which in the present instance includes flanges 46 and 47 non-rotatably secured to the shaft 32, spokes 48 radiating from the flange 46, and braces 49 radiating from the flange 47 and attached at their outer ends to the spokes 48 to make the frame rigid.

Secured as by flat headed bolts 54 to the spokes 48 are inner and outer brush drive rings 55 and 56 having pins 57 and 58 extending upwardly therefrom at regular intervals. Disposed within the ring 55 is an inner channel ring 60, the channel of which faces outward and which is provided with attaching plates 61, one of which rests upon each of the spokes 48 and is secured thereto as by a bolt 63.

The outer ends of the spokes 48 extend beyond the outer brush drive ring 56 a short distance and each spoke end extends into a channel 64 of a slide bracket 65 and is secured to this bracket by cap screws 66. Each bracket 65 provides, on opposite sides of its channel 64, lugs 67, each of which has a threaded hole 68 in which a cap screw 69 is screwed downwardly. The upper surfaces of the lugs 67 are flush with the upper surface of the spoke on which that bracket is secured.

Disposed outside of the outer brush drive ring 56 is an outer channel ring 70 which faces inward and is divided into sectors 71, the opposite ends of each of which are provided with slide plates 72 having slots 73 through each of which one of the cap screws 69 is extended before being screwed into its hole 68. The slots 73 in the plates 72 attached to each sector 71 are parallel so that, when the screws 69 extending through these slots are loosened, this sector may be shifted inwardly or outwardly relative to the wheel 31.

The annular brush 30 is adapted to be made up of a series of segment-like brushes 75, preferably having wooden backs 76, which are secured between inner and outer channel rings 60 and 70.

The side walls 18 and 19 and the overhead series of brushes 24 cooperate with the annular brush 30 to form a washing channel 78. Positioned in the bay 12 for guiding fruit into this channel is a guide board 80 and vertical guide walls 81 and 82. For guiding fruit from the discharge end of the channel 78, vertical guide walls 83 and 84 and a guide board 85 in the bay 13 are provided.

For a purpose which will be made clear hereinafter, it is necessary in the operation of the preferred embodiment of my invention illustrated herein, to have a space provided just outside of one of the sectors 71 into which each of these sectors may be successively shifted when opposite this space. The preferred manner of accomplishing this is to hingedly connect an edge portion of one of the boards 80 or 85 to the body thereof so that this portion may be shifted away from the brush wheel 31 to provide the free space just mentioned. In the illustrated embodiment, an edge portion 90 of the guide board 80 is hingedly connected to the body of this board by hinges 91 so that the portion 90 may be swung backwardly on the body of the board, as shown in Figs. 2 and 6.

Owing to the fact that the brush wheel 31 is normally rotated in the direction of the arrow 92 in Fig. 1 and the fruit is moving away from this brush when it drops onto the guide board 85, it is possible to space the guide board 85 a sufficient distance from the wheel 31 to provide a free space 93 between the wheel and this guide board, which spacing will serve the same purpose as hinging the edge portion 90 of the guide board 80.

The preferred manner in which the segmental brushes 75 are installed, removed or replaced, is illustrated in Figs. 5, 6 and 8. The edge portion 90 of the guide board 80 is swung out of the way on its hinges 91 as shown in Fig. 6 to provide a free space 95. The wheel 31 is then rotated to bring one of the sectors opposite the space 95, and cap screws 69 which secure this sector in position are loosened and the sector pulled outwardly. Each brush back 76 is provided with holes 97 and 98 which are adapted to receive a pair of the pins 57 and 58 when this brush is installed. The installation is effected by inserting the inner or narrower end of the brush back into the channel 60, as shown in Fig. 8 by broken lines 99, and then swinging the brush downwardly into its full line position in this figure so that the pins 57 and 58 enter the holes 97 and 98. The brushes 75 are so made that an even number of brushes occupy the space opposite each sector 71. When this space has been filled with brushes the extended sector is slid into position with the outer ends of the adjacent brushes 75 embraced by this sector. The screws 69 are now tightened against the end plates 72 of this sector so as to rigidly secure it in place. In case brushes are to be removed and others substituted therefor, the removal is easily effected by the reversal of the installation process, that is, expanding the sector 71 opposite the worn brushes and lifting these out through the dotted line position 99, and then installing brushes in their place in the manner just described.

The installation or replacing of brushes in the wheel 31 is accomplished by sectors, each sector being opposite the space 95 or the space 93 when the process is performed.

Owing to the fact that only two cap screws 69 need to be loosened to permit brushes opposite one eighth of the outer channel 70 to be removed or replaced, this operation can be accomplished in a very short time. Thus periods of waiting by the sorting or packing crew upon the repairing of the annular brush 30 in a washer 10 are reduced to an absolute minimum.

It is desired to point out further that when the sectors 71 are locked in position by the cap screws 69 the brushes 75 are rigidly held in place so that it would be impossible for any of these to be accidently displaced so as to damage the machine or fruit passing therethrough.

Referring now to Figs. 9 to 13 inclusive, a brush wheel 131 is here shown, the structure of which is identical with that of the brush wheel 31 except as hereinafter pointed out. Similar or corresponding parts in the wheel 131 will be given reference numerals which are formed by adding one hundred to the number given hereinbefore to the corresponding element in the brush wheel 31.

Spokes 148 terminate at the outer drive ring 156 and brackets 165 are reversed and secured to the spokes 148 just inside of the inner channel ring 160 as by the cap screws 163 screwed downwardly into said brackets and by cap screws 166 extending upwardly through the brackets into the spokes. Extending upwardly through suitable openings in each of the brackets 165 and having wing nuts 200 on their upper ends, are bolts 201 which have squared shanks adjacent their heads, the purpose of which will become evident hereinafter.

The outer channel ring 170 is divided into sectors 171 which have no attachments on their ends as do the sectors 71, but are mounted on slide bars 205 which slide in brackets 206 and 207 which are attached to bottom faces of the brush drive rings 155 and 156. Each sector 171 has a pair of these bars, the inner ends of which are provided with slots 208 each of which receives a shank of one of the bolts 201 as shown in Figs. 10 and 11. Each pair of bars 205 thus provides a shiftable mounting for the sector 171 secured thereon so that this sector can be shifted between inner and outer positions when the wing nuts 200 opposite that sector are loosened, and when the sector is positioned to grip a series of brushes 175 disposed thereopposite it may be rigidly retained in place by tightening its wing nuts 200.

It is thus seen that the function of the wheel 131 is substantially the same as that of the wheel 31. One of the principal advantages of the wheel 131 is that there is no part of the structure thereof extending outwardly beyond the outer channel member 170. This eliminates any possibility of the operator's having his hand injured by extending it into the water of the washer adjacent the outer ring of the washer wheel while this wheel is rotating.

What I claim is:

1. In a fresh fruit washing machine, the combination of: a shaft; a frame radiating from said shaft; an outward facing annular channel member provided upon said frame, said member having a substantially smaller radius than said frame; an inward facing annular channel member provided on said frame near the periphery thereof; a series of segmental brushes adapted to have their opposite ends extend into said channel members to rigidly mount said brushes on said wheel to form an annular brush member between said channel members; and means for mounting the outer of said channel members on said frame so that any one of a plurality of sectors into which said member is divided may be shifted radially to engage or release a group of brushes opposite said sector, as aforestated.

2. In a fresh fruit washing machine, the combination of: a shaft; spokes radiating from said shaft; an outward facing annular brush holding member provided upon said spokes, said member having a substantially smaller radius than said spokes; an inward facing annular brush holding member provided on said spokes near the periphery thereof; a series of segmental brushes adapted to have their opposite ends extend into said brush holding members to rigidly mount said brushes on said wheel to form an annular brush member between said brush holding members, the outer of said brush holding members being divided into sectors terminating at the ends of said spokes; means for mounting said sector ends on said spoke ends to permit radial adjustment of said sectors to engage or release outer ends of the group of brushes opposite said sector.

3. In a fresh fruit washing machine, the combination of: a shaft; spokes radiating from said shaft; an outward facing annular channel member rigidly secured upon said spokes and having a substantially smaller radius than said spokes; an inward facing annular channel member having substantially the same radius as said spokes and divided into sectors terminating at ends of said spokes; means on said spoke ends for receiving screws; means on said sector ends having slots receiving said screws and permitting said sectors to be secured in an inner position or released and shifted to an outer position; and a series of segmental brushes adapted to have their opposite ends extend into both of said channel members when said inward facing channel member is in its inner position, a group of said brushes being released for removal when the sector opposite said brushes is in its outer position.

4. In a fresh fruit washing machine, the combination of: a shaft; a frame extending in a radial plane from said shaft; a series of segmental brushes adapted to be assembled on said frame to form an annular brush member mounted in a radial plane relative to said shaft; inner and outer brush holding members for receiving opposite ends of said brushes to lock them in position; slide bars on which a portion of said outer brush holding member is mounted; means for slidably mounting said bars on said frame; and means for locking said bars in position so that said outer member portion will embrace a group of said brushes, said means being located on said frame within said inner brush holding member.

5. In a fresh fruit washing machine, the combination of: a shaft; spokes radiating from said shaft; an outward facing annular channel member provided upon said spokes, said member having a substantially smaller radius than said spokes; ring means connecting said spokes outwardly from said channel member; a series of brushes adapted to rest on said ring means to extend into said channel member; and means slidably mounted on said ring means for gripping outer portions of a group of said brushes; and means for temporarily retaining said last aforementioned means in gripped relation with said group of brushes.

6. In a fresh fruit washing machine, the combination of: a washing wheel; an annular brush provided on said wheel, said brush lying substantially in a horizontal plane and being made up of segments; means for gripping the inner and outer ends of said segments to maintain them in assembled relation, a portion of the means for holding the outer ends of said segments being shiftable outwardly to release said segments; and a stationary fruit guide positioned adjacent the outer edge of said brush wheel to assist in the transfer of fruit onto or from said wheel, said fruit guide being shiftable to provide a space adjacent the periphery of said brush wheel to permit the outward shifting of said shiftable portion of said means for holding the outer ends of said brush segments.

7. In combination: a shaft; a frame extending from said shaft in a substantially radial plane; a series of segmental brushes adapted to be assembled on said frame to form an annular brush member radially disposed relative to said shaft; inner and outer annular brush holding members for holding inner and outer ends of said brushes, one of said members being divided into sectors; guide means for mounting certain of said sectors upon said frame and limiting the movement of said sectors relative to said frame to a radial movement between definite brush engaging and disengaging positions; and means for securing said movable sectors in said brush engaging positions.

8. A combination as in claim 7 in which said movement permitted said sectors is a rectilinear, radial movement.

9. In a brush wheel the combination of: a shaft; an open frame structure mounted thereon in a radial plane; a series of segmental brushes adapted to be assembled to form an annular brush member; an annular inner channel ring supported by said frame at spaced points, said ring having an outwardly facing channel; a plurality of outer channel sectors having inwardly facing channels; and means for supporting each of said sectors at spaced points on said frame, said means permitting a radial shifting of said sectors to engage and disengage groups of said brushes without disconnecting said sectors from said frame.

10. A combination as in claim 9 in which means are provided on said sector mounting means for locking said sectors in brush engaging positions.

11. In a washing machine, the combination of: a shaft; a frame extending in a radial plane from said shaft; a series of segmental brushes adapted to be assembled on said frame to form an annular brush member mounted in a radial plane relative to said shaft; annular inner and outer brush holding members for receiving opposite ends of said brushes to position these on said frame, said outer holding member being divided into sectors; means for mounting said sectors on said frame so that said sectors are shiftable radially to engage and disengage certain of said brushes without detaching said sectors from said frame; and means disposed inside of said inner brush holding member for controlling said mounting means to hold said sectors in brush gripping positions.

In testimony whereof, I have hereunto set my hand at Los Angeles, California, this 26 day of December, 1930.

EARL G. GRIFFITH.